United States Patent [19]

Lebensfeld et al.

[11] Patent Number: 5,073,140
[45] Date of Patent: Dec. 17, 1991

[54] TOY ACTION FIGURES AND SPEECH AND SOUND EFFECTS ACCESSORY THEREFOR

[75] Inventors: Steven Lebensfeld, 805 Pond La., Woodsburgh, N.Y. 11598; Harvey Goldberg, 8 Northbank Ct., Thornhill, Ontario, Canada, L3T 7J7; David C. K. Kwan, Block A & B, 3/F., CDW Bldg., 382-392 Castle Peak Road; Ma H. Wai, Unit 7, 10/F., Wah Chun Industrial Bldg., 54-58 Tai Chung Road, both of Tsuen Wan, N.T., Hong Kong

[73] Assignees: Steven Lebensfeld, Woodsburgh, N.Y.; Harvey Goldberg, Thornhill, Canada; David C. K. Kwan; Ma H. Wai, both of Tsuen Wan, Hong Kong

[21] Appl. No.: 602,150

[22] Filed: Oct. 22, 1990

[51] Int. Cl.[5] .................. A63H 5/04; A63H 3/28
[52] U.S. Cl. ........................... 446/297; 446/405; 446/268
[58] Field of Search ............. 446/297, 303, 268, 397, 446/175, 405–407, 473, 409

[56] References Cited

U.S. PATENT DOCUMENTS

| | | |
|---|---|---|
| 3,354,577 | 11/1967 | Glass et al. . |
| 3,394,493 | 7/1983 | Glass et al. . |
| 3,928,932 | 12/1975 | Maurer . |
| 4,267,551 | 5/1981 | Dankman et al. . |
| 4,318,245 | 3/1982 | Stowell et al. . |
| 4,516,950 | 5/1985 | Berman et al. ............... 446/297 |
| 4,626,222 | 12/1986 | Sweet ............................ 446/268 |
| 4,646,350 | 2/1987 | Batra ............................. 381/51 |
| 4,690,655 | 9/1987 | Bailey ........................... 446/84 |
| 4,696,654 | 9/1987 | Welch et al. ................. 446/268 |
| 4,723,931 | 2/1988 | Allen et al. .................. 446/268 |
| 4,802,879 | 2/1989 | Rissman et al. ............. 446/175 |
| 4,809,335 | 2/1989 | Rumsey ....................... 381/53 |
| 4,820,233 | 4/1989 | Weiner ......................... 446/303 |
| 4,840,602 | 6/1989 | Rose ............................. 446/175 |
| 4,857,030 | 8/1989 | Rose ............................. 446/303 |
| 4,878,871 | 11/1989 | Noto ............................. 446/302 |
| 4,878,873 | 11/1989 | Yamaguchi et al. ......... 446/321 |
| 4,993,983 | 2/1991 | Kurita et al. ................ 446/409 X |

OTHER PUBLICATIONS

3 Photographs of Hasbro G. I. Joe Sonic Fighter.
1 Bubble Pack Card of Hasbro G. I. Joe Sonic Fighter ©1990.

Primary Examiner—Mickey Yu
Attorney, Agent, or Firm—Rosen, Dainow & Jacobs

[57] ABSTRACT

Toy action figures and detachable accessories therefor incorporating audio generating apparatus are disclosed. The audio generating apparatus is entirely contained within the accessory and generates both speed and sound effects. The detachable accessories have a configuration and visual appearance coordinated with the configuration and visual appearance of the toy action figure. For example, the accessory may be a backpack configured and having a visual appearance to coordinate with a soldier, spaceman or policeman action figure. The audio generating apparatus includes separate controls for causing the audio generating apparatus to independently generate speech and sound effects. The accessories in configuration, appearance and sound content are made to be attachable and applicable to different types of action figures.

38 Claims, 2 Drawing Sheets

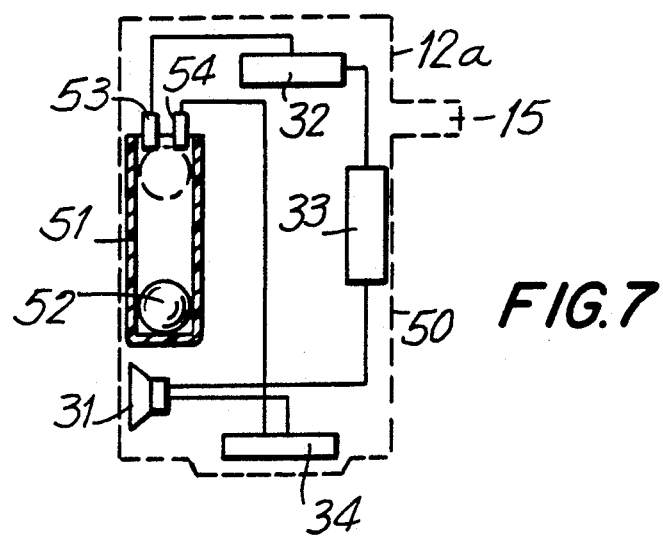
FIG. 7
FIG. 5
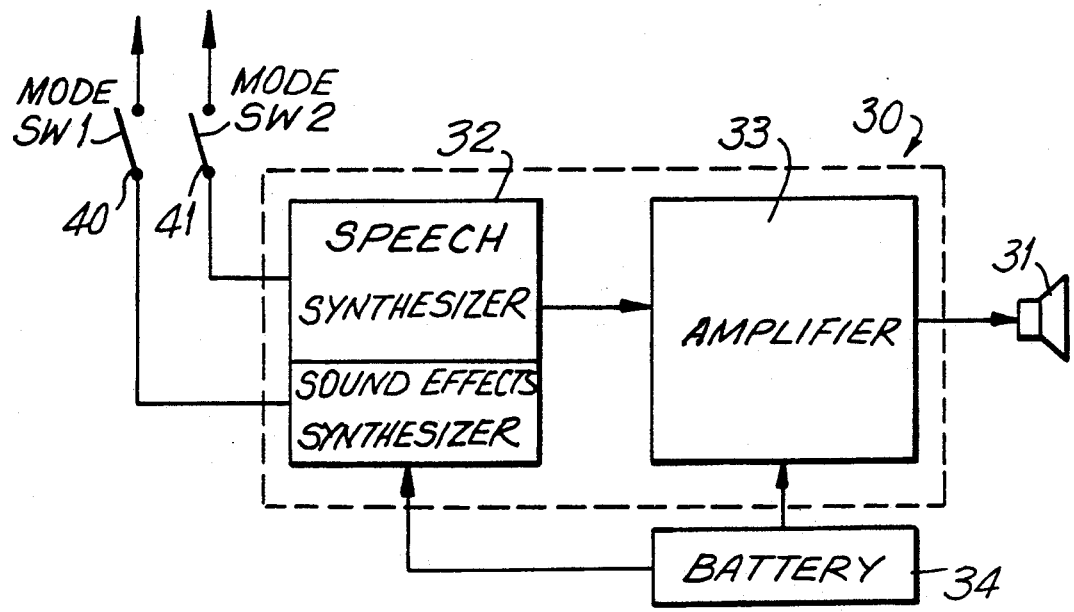
FIG. 6
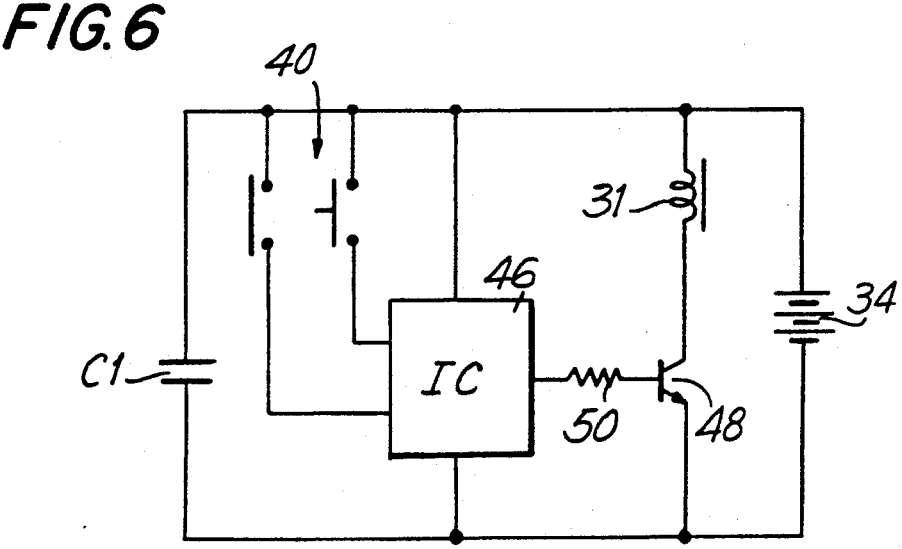

TOY ACTION FIGURES AND SPEECH AND SOUND EFFECTS ACCESSORY THEREFOR

BACKGROUND OF INVENTION

This invention relates to toys, and in particular to toy action figures which generate speech and sound effects.

Toy action figures are miniature figures having a configuration and visual appearance which represent a person or thing of an exciting nature, such as a soldier, policeman, spaceman, robot, creature, fashion model, flight attendant or the like. Current action figures include articulated parts, and in the case of a human figure, articulated body parts such as arms, legs, head, etc. Such action figures are typically from about 2½ inches to about 6 inches in height, with currently popular articulated versions being about 3¾ inches in height. Examples of toy action figures are shown in U.S. Pat. No. 4,802,879 (Rissman et al.) and U.S. Pat. No. 4,723,931 (Allen et al.).

The following U.S. patents disclose dolls with incorporate speech generating or sound effects generating apparatus: U.S. Pat. No. 4,267,551 (Dankman et al.); U.S. Pat. No. 4,318,245 (Stowell et al.); U.S. Pat. No. 4,809,335 (Rumsey); U.S. Pat. No. 4,840,602 (Rose); and 4,857,030 (Rose). U.S. Pat. No. 4,802,879 (Rissman et al.) discloses a toy action figure which incorporates sound effects generating apparatus in the body thereof. In the '551 Dankman et al. and the '879 Rissman et al. patents, a detachable accessory such as a mock weapon may be used to activate the sound generating apparatus incorporated in the body of the doll or action figure. Toy action figures with a detachable backpack accessory that includes sound effects only generating apparatus are currently available from Hasbro, Inc.

SUMMARY OF THE INVENTION

It is an object of the invention to make toy action figures, particularly articulated ones, more active by providing speech and sound effects therefor.

It is another object of the invention to provide such speech and sound effects for toy action figures in such a way that a library of word phrases and sound effects may be assembled for use with toy action figures.

It is another object of the invention to enable word phrases and sound effects to be used interchangeably with different toy action figures.

It is another object of the invention to provide audio generating apparatus for toy action figures which generates both speech and sound effects.

It is another object of the invention to achieve the above objects in an economical and easy to implement fashion.

These and other objects and advantages as will appear hereinafter are achieved in accordance with the invention by providing audio generating apparatus for toy action figures as part of a portable accessory for removable attachment to and support by the toy action figure. Such an accessory has a configuration and visual appearance coordinated with the configuration and visual appearance of the toy action figure. In other words, the accessory is coordinated with the costume or other characteristics of the toy action figure so that, though removable, appears to be part of the toy action figure. For example, the accessory may be a backpack configured and having a visual appearance to coordinate with a soldier, spaceman or policeman action figure, or a portable communications set configured as a backpack for a soldier, spaceman or policeman toy action figure, or a weapon configured as an anti-tank or anti-space vehicle weapon that coordinates with a soldier or a spaceman toy action figure, or a hand bag or luggage for a fashion model or a flight attendant toy action figure, etc.

According to the invention, a plurality of accessories, preferably of different kinds, with varying speech patterns and sound effects patterns are provided for the same type of toy action figure or for different types of toy action figures to thereby create a library of speech patterns and sound effects patterns that children may choose from. Many of the accessories may be used interchangeably with the same or different types of action figures. As described above, a weapon or backpack may be configured visually and include speech and sound effects appropriate for use with a soldier, spaceman or policeman.

For use with interchangeable accessories, the speech patterns and the sound effects patterns may be of a general nature so as to be applicable to a number of different types of toy action figures. For example, weapons sound effects for military, police or space environments may be selected so as to be appropriate for all of those environments. Similarly, speech patterns may be selected to also have application to more than one environment.

Alternatively, the accessories may be limited by their speech patterns and sound effects to closely similar environments such as police and military.

The audio-generating apparatus is selectively operable to generate both speech and sound effects. Preferably, the speech and the sound effects may be activated independently of each other. In the preferred embodiment, two manually actuable controls are provided on the accessory, one for activating speech and one for activating sound effects.

All components necessary to activate and generate the desired audio are contained on or within the accessory. Thus, the audio generating apparatus is entirely self contained within the accessory, and the toy action figures may be manufactured as before.

The action figures and the accessories are provided with cooperating structure for removably attaching the accessory to the figure. For example, such structure may include a friction-fit projection and receptacle arrangement, or a bayonet type arrangement, or a Velcro-type arrangement, etc.

In the preferred embodiment, the audio generating apparatus includes a voice synthesizer integrated circuit comprising a read only memory (ROM) having independently programmable and readable sections. In accordance with the invention, it was recognized that such a voice synthesizer was capable of independently generating both speech and sound effects. This and selection of a miniature speaker and miniature switches enabled the entire audio-generating apparatus to be incorporated into small accessories such as backpacks, weapons, communication equipment, etc., for 3¾ inch action figures. Such miniaturization enables the accessory to be made to proper scale with respect to smaller toy action figures such as the 3¾ inch size.

BRIEF DESCRIPTION OF THE DRAWINGS

The invention is illustrated by way of example and not limitation in the figures of the accompanying drawings in which like references in the different figures refer to the same or corresponding parts, and in which:

FIG. 5 is a block diagram of the audio-generating apparatus of the backpack accessory depicted in FIG. 1;

FIG. 6 is a schematic circuit diagram of the audio-generating apparatus of the backpack accessory depicted in FIG. 1; and FIG. 7 is an enlarged schematic view of an accessory according to another embodiment of the invention with a position-responsive electrical switch.

DESCRIPTION OF THE PREFERRED EMBODIMENTS

Figure 1:
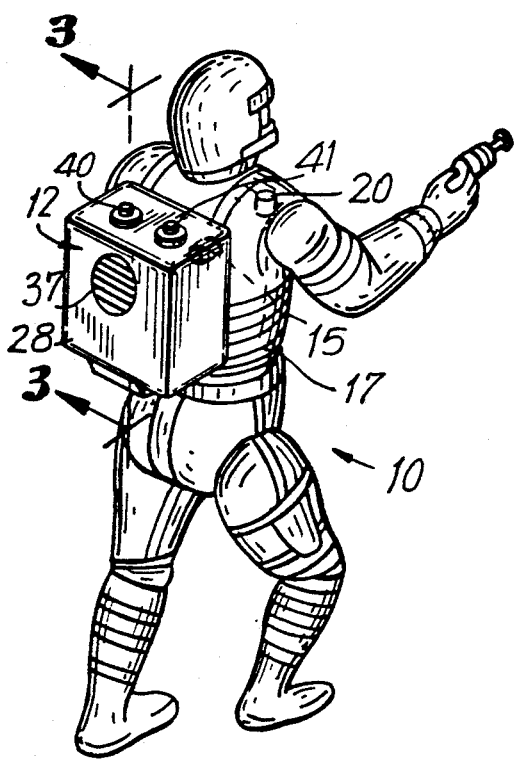
FIG. 1 is a perspective view of a toy action figure configured as a spaceman with a back pack accessory attached thereto in accordance with the invention.
Figure 2:
FIG. 2 is a perspective view of another toy action figure configured as a soldier with a weapon accessory attached thereto in accordance with the invention.

FIGS. 1 and 2 illustrate two articulated toy action figures 10, 11 and two accessories 12, 13 therefor, respectively. Action figures 10 and 11 each support the respective accessory 12, 13. Accessories 12, 13 incorporate audio-generating apparatus and may be used interchangeably with action figures 10 and 11. Action figures 10 and 11 may be articulated figures having movable limbs, head, etc., and may be conventional except perhaps for the structure used to removably attach the accessories 12, 13 thereto. Action figure 10 in FIG. 1 is configured as and has the visual appearance of a spaceman, and action figure 11 in FIG. 2 is configured as and has the visual appearance of a soldier.

Both accessories 12 and 13 are configured and have visual appearances to fit or coordinate with the configuration and appearance of the spaceman and/or soldier, and preferably both. For example, the accessory 12 is a backpack of the type that could be worn by the spaceman toy figure 10, the soldier toy figure 11, or a policeman toy figure (not shown). Similarly, the accessory 13 is a weapon of the type that may be used by the spaceman toy figure 10, the soldier toy figure 11, or by a policeman figure.

Figure 3:
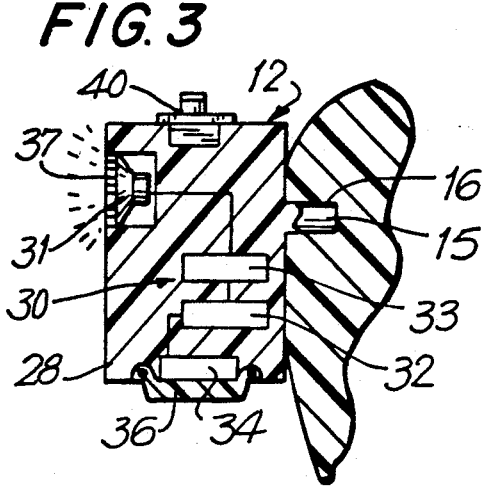
FIG. 3 is a sectional view through the spaceman action figure depicted in FIG. 1 taken along line 3—3 thereof showing the backpack accessory.

Referring to FIG. 3, the backpack 12 comprises a configured pin 15 adapted to be snap-fitted into a complementary receptor opening 16 in the torso 17 of the spaceman figure 10 and into a complementary receptor opening (not shown) in the torso 18 of the soldier figure 11. The configurations of the pin 15 and the receptor opening 16 may be such as to enable the backpack 12 to assume only a desired orientation or orientations with respect to the toy action figures 10 and 11.

Figure 4:
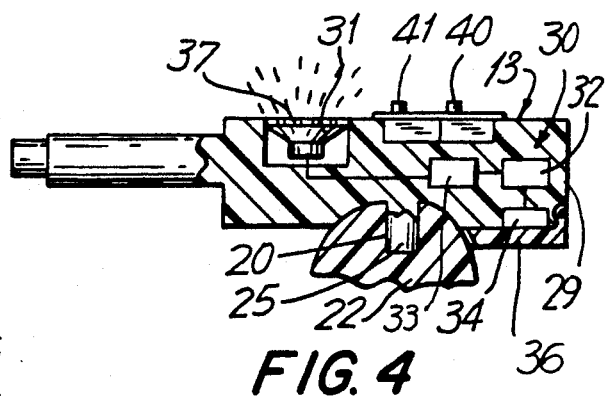
FIG. 4 is a sectional view through the soldier action figure depicted in FIG. 1 taken along line 4—4 thereof showing the weapon accessory.

Referring to FIG. 4, a second receptor opening 20, identical to the first opening 16, is provided on the shoulder of the torso 17 of the spaceman figure 10 and on the shoulder of the torso 18 of the soldier figure 11. The accessory 13 is configured and ornamented as a weapon, and is provided with a configured pin 25 identical to pin 15 on the backpack 12. Thus, the weapon accessory 13 also can be snap-fitted to a respective toy action figures 10, 11, and may assume only a desired configuration or configurations with respect to the figure. Since any mounting pin 15, 25 on either of the accessories 12, 13 will fit any receptor opening 16, 20, respectively, on either of the toy action figures 10, 11, the accessories are interchangeable with respect to the toy action figures, so that the backpack accessory 12 and the weapon accessory 13 can be snap-fitted on either action figure 10 or action figure 11.

The configuration and visual appearance of the accessories 12 and 13 is d(R)signed so that each is appropriately matched to the configuration and visual appearance of any of a number of different toy action figures on which it is intended to be supported. The audio generating apparatus incorporated into each accessory may generate the same speech and sound effects pattern for each same accessory, or a limited number of different speech and sound effects patterns for the same accessory, i.e., all backpack accessories may have the same speech and sound effects patterns or a limited number of different patterns.

Thus, a number of action figures of the same or different type may be used in a single imaginative scene, and any of a number of desired accessories may easily be placed with any of a number of desired figures with the possibility of interchangeably reassigning accessories to the figures. As a result, visual and audio possibilities are greatly expanded with only a small number of action figures and accessories. This is made possible because each accessory incorporates the entire audio generating apparatus so that audio generation is independent of the figure, and because the accessories' configurations and visual appearances, and the audio to be generated are usable with different types of action figures.

Referring to FIGS. 3-5, each accessory 12, 13 comprises a housing 28, 29, respectively, with configurations and appearances as previously described, which carries on its interior and/or exterior the entire audio-generating apparatus 30, i.e., all of the components needed to generate speech and sound effects. The audio generating apparatus 30 includes a small speaker or electrical-to-sound transducer 31 driven by speech and sound synthesizing circuitry 32 via an amplifier 33. The synthesizing circuitry 32 includes both a speech synthesizer and a sound effects synthesizer, and may be a single integrated circuit ("IC") and the amplifier may comprise an audio transistor, which are energized by one or more small watch-type (button-cell) batteries 34. If desired, the synthesizing circuitry 32 and the audio transistor of the amplifier 33 may be incorporated into a single IC. A sliding lid 36 is provided on the housing to access the battery 34 when necessary to replace same. Slots 37 may be provided in the housing for enhancing the availability of the speaker sounds.

Two electrical switches 40 and 41 are mounted on each accessory 12, 13 for manual operation. Preferably, each switch 40, 41 is a push-button, momentary contact, single pole, single throw switch. Thus, each switch may be independently activated. Switch 40 controls activation of mode 1 operation and switch 41 controls activation of mode 2 operation. Alternatively, switches 40 and 41 may be combined into a single double pole, double throw slide switch (not shown) with a center off position, a mode 1-on position on one side, and a mode 2-on position on the other side. Pressing either push-button switch, or moving the slide to one or the other side selects mode 1 or mode 2 operation.

Preferably, the audio-generating apparatus generates both speech patterns and sound effects patterns, and is capable of doing so independently of the other. For example, mode 1 operation may be selected for speech, and mode 2 operation selected for sound effects. Alternatively, more than two modes may be available by using a switch and electronics, as in some digital watches, which responds to one or more switch closures to select a different mode.

Providing a portable speech and sound accessory or module, readily attachable and detachable to one of multiple toy action figures, and actuable to independently play speech patterns and sound effects, greatly enhances the capabilities of creating various audio and play combinations, and expands the use of a limited number of accessories and toy action figures.

Referring to FIG. 6, audio-generating apparatus 30 comprises an IC 46 which includes all the speech and sound synthesizing circuitry including a ROM. The ROM is partitioned such that different parts thereof may be programmed and independently activated. For example, each partitioned part of the ROM may be independently caused to be read by a switch activation. IC 46 in the preferred embodiment is a W52300 Series ADPCM voice synthesizer available from Winbond. IC 46 is coupled via a resistor 50 e.g., 470 ohm., to a transistor 48 functioning as an audio transistor. Transistor 48 may be a type 90131. The collector of transistor 48 is coupled to battery 34 via speaker 31, and thus drives speaker 31. Battery 34 is also coupled to the power input of IC 46. Speaker 31 comprises a ferrite core coil which vibrates a mylar cone. The power rating of speaker 31 need be only about 70-100 mw. Its size is approximately 21 mm in diameter and about 7 mm in height. Such speakers are known to those of skill in the art.

Switches 40 and 41 are micro-miniature momentary contact push button switches as described above which may be roughly 8 mm in diameter and 7 mm in height. Such switches may be of the conductive rubber type and are known to those of skill in the art. Switches 40 and 41 each have one contact coupled to a different trigger input of IC 46, and another contact coupled to battery 34. Therefore, audio generating apparatus 30 is caused to generate speech or sound effects by applying the battery voltage to the respective trigger input of IC 46. Battery 34 comprises three 1.5 v miniature watch-type batteries (button cells) which are known to those of skill in the art.

As described above, the entire audio-generating apparatus 30 is contained in or on the accessory, so that it is not necessary to include audio generating parts in the action figures, which would make them more difficult to manufacture and more expensive. The invention thus makes it possible to have many low cost action figures without any electronics, and only a limited number of accessories with the audio-generating apparatus, which may be attached to selected figures by simple mechanical means. Thus, a relatively inexpensive toy with speech and sound effects can be assembled.

The invention is not limited to manually operable switches for activating the audio-generating apparatus. For example, referring to FIG. 7, an electrical switch 50 can be incorporated that closes dependent on accessory orientation. Such switches are known and may be of the rolling ball type illustrated in FIG. 7, or of the mercury type. Switch 50 in FIG. 7 is incorporated in backpack 12a and comprises a chute 51 with a metal ball 52, and at the upper end spaced switch contacts 53, 54. Chute 51 may be oriented horizontally in the usual position of the action figure so that when the action figure to which the back pack 12a is attached is rotated, the ball 52 rolls down the chute 51 and contacts and closes the switch contacts 53, 54 to energize the audio-generating apparatus to play speech or sound effects.

While the invention has been described with respect to independent generation of speech and sound effects, such generation may be related. For example, a single switch may be provided which when actuated causes the audio-generating apparatus to play both speech and sound effects in a given or given sequences, or which when activated in a given or given sequences causes the audio-generating apparatus to play both speech and sound effects in a given or given sequences.

While the invention has been described in connection with the preferred application to toy action figures, the invention is not so limited. Accessories containing the audio generating apparatus of the invention are also usable with non-articulated toy figures, as well as with other non-human-representative toy objects such as, for example, vehicles.

Moreover, the invention is not limited to the use of snap-fit structure for attaching the accessory to a toy action figure. Other mechanical connections are also suitable, for example, a bayonet connection, where the accessory has to be inserted and rotated to positively lock the accessory in place. Such a connection has the benefit that the accessory with the audio generating apparatus is less likely to detach from the toy action figure and become damaged during play. Velcro-type fasteners may also be used as well other mechanical and non-mechanical fasteners.

While the invention has been described and illustrated in connection with preferred embodiments, many variations and modifications as will be evident to those skilled in this art may be made without departing from the spirit of the invention, and the invention as set forth in the appended claims is thus not to be limited to the precise details of construction set forth above as such variations and modifications are intended to be included within the scope of the appended claims.

What is claimed is:

1. A toy comprising, in combination:
   at least one toy action figure having a given configuration and visual appearance; and
   at least one accessory having a configuration and visual appearance which is coordinated with the configuration and visual appearance of said toy action figure;
   said toy action figure and said accessory having cooperating means for removably attaching said accessory to said toy action figure;
   said accessory including audio generating apparatus for generating speech and sound effects, said audio generating apparatus comprising at least one selectively actuable control for causing said audio generating apparatus to generate said speech and sound effects, said generating apparatus being carried entirely by said accessory.

2. The toy of claim 1 wherein said audio generating apparatus comprises a plurality of selectively actuable controls, at least one said control being coupled to cause said audio generating apparatus to generate at least one speech pattern, and at least one said control being coupled to cause said audio generating apparatus to generate at least one sound effects pattern, said audio generating apparatus generating said speech and sound effects patterns independently of each other in response to actuation of the respective control.

3. The toy of claim 1 wherein said cooperating means comprises structure on said toy action figure and on said accessory for snap-fitting said accessory to said toy action figure.

4. The toy of claim 1 wherein said cooperating means comprises structure on said toy action figure and on said accessory defining a bayonet-type connection for positively but releasably attaching said accessory to said toy action figure.

5. The toy of claim 1 wherein said control comprises a manually actuable switch.

6. The toy of claim 1 wherein said control comprises a gravity sensitive switch actuable by movement of said accessory.

7. The toy of claim 1 wherein said audio generating apparatus further comprises a sound synthesizer and a speaker.

8. The toy of claim 7 wherein said sound synthesizer comprises ROM programmed to generate said at least one speech pattern and said at least one sound effects pattern.

9. The toy of claim 8 wherein said sound synthesizer consists of a single integrated circuit.

10. The toy of claim 8 wherein said ROM is partitioned and configured so as to store said at least one speech pattern and said at least one sound effects pattern to be independently readable, said at least one control being operable to cause said audio generating apparatus to independently generate said at least one speech pattern and said at least one sound effects pattern stored in said ROM.

11. The toy of claim 1 wherein said accessory is configured and has a visual appearance coordinated with those of a plurality of different action figures.

12. The toy of claim 11 wherein said plurality of action figures include at least two different figures configured as and having the visual appearance of a military figure, police figure or space figure, and the accessory is coordinated with both of said at least two figures.

13. The toy of claim 12 wherein said accessory is configured and has the visual appearance of a backpack or a weapon.

14. An accessory for a toy action figure which generates at least one speech pattern and at least one sound effects pattern, said accessory having:
a configuration and visual appearance which is coordinated with the configuration and visual appearance of said toy action figure; and
means cooperating with means on said toy action figure for removably attaching said accessory to said toy action figure;
said accessory including audio generating apparatus for generating said at least one speech pattern and said at least one sound effects pattern, said audio generating apparatus comprising at least one selectively actuable control for causing said audio-generating apparatus to generate a said speech pattern and a said sound effects pattern, said audio generating apparatus being carried entirely by said accessory.

15. The accessory of claim 14 wherein said audio generating apparatus comprises a plurality of selectively actuable controls, at least one said control being coupled to cause said audio generating apparatus to generate said at least one speech pattern, and at least one said control being coupled to cause said audio generating apparatus to generate said at least one sound effects pattern, said audio generating apparatus generating said speech and sound effects patterns independently of each other in response to actuation of the respective control.

16. The accessory of claim 14 wherein said control comprises a manually actuable switch.

17. The accessory of claim 14 wherein said control comprises a gravity sensitive switch actuable by movement of said accessory.

18. The accessory of claim 14 wherein said audio generating apparatus further comprises a sound synthesizer and a speaker.

19. The accessory of claim 18 wherein said sound synthesizer comprises ROM programmed to generate said at least one speech pattern, and said at least one sound effects patterns.

20. The toy of claim 19 wherein said sound synthesizer consists of a single integrated circuit.

21. The toy of claim 19 wherein said ROM is partitioned and configured so as to store said at least one speech pattern, and said at least one sound effects pattern, said at least one control being operable to cause said audio generating apparatus to independently generate said at least one speech pattern and said at least one sound effects pattern stored in said ROM.

22. A toy comprising, in combination:
a plurality of toy action figures each having a different given configuration and visual appearance; and
a plurality of accessories each having a configuration and visual appearance which is coordinated with the configuration and visual appearance of at least two of said toy action figures;
each of said toy action figures and each of said accessory having cooperating means for removably attaching any of said accessories to any of said toy action figures;
each of said accessories including audio generating apparatus for generating speech and sound effects, said audio generating apparatus comprising at least one selectively actuable control for causing said audio generating apparatus to generate said speech and sound effects, said audio generating apparatus being carried entirely by said accessory.

23. The toy of claim 22 wherein said audio generating apparatus comprises a plurality of selectively actuable controls, at least one said control being coupled to cause said audio generating apparatus to generate at least one speech pattern, and at least one said control being coupled to cause said audio generating apparatus to generate at least one sound effects pattern, said audio generating apparatus generating said speech and sound effects patterns independently of each other in response to actuation of the respective control.

24. The toy of claim 22 wherein said audio generating apparatus further comprises a sound synthesizer and a speaker.

25. The toy of claim 24 wherein said sound synthesizer comprises ROM programmed to generate said at least one speech pattern, and said at least one sound effects pattern.

26. The toy of claim 25 wherein said sound synthesizer consists of a single integrated circuit.

27. The toy of claim 25 wherein said ROM is partitioned and configured so as to store said at least one speech pattern and said at least one sound effects pattern, said at least one control being operable to cause said audio generating apparatus to independently generate said at least one speech pattern and said at least one sound effects pattern stored in said ROM.

28. The toy of claim 22 wherein said plurality of action figures include at least two different figures configured as and having the visual appearance of a military figure, police figure or space figure, and each of said accessories is coordinated with both of said at least two figures.

29. The toy of claim 28 wherein said accessory is configured and has the visual appearance of a backpack or a weapon.

30. The toy of claim 1 wherein a first said control is coupled to said audio generating apparatus, and said audio generating apparatus is configured, so as to generate at least one speech pattern and at least one sound effects pattern upon activation of said first control.

31. The toy of claim 8 wherein said ROM is partitioned and configured so as to store said at least one speech pattern and said at least one sound effects pattern to be independently readable, and wherein said audio generating apparatus is configured so that at least one speech pattern and at least one sound effects pattern may be sounded in at least one desired sequence by activation of at least one control.

32. The toy of claim 31 wherein a first said control is coupled to said audio generating apparatus, and said audio generating apparatus is configured, so as to generate at least one speech pattern from a first partitioned part of said ROM and at least one sound effects pattern from a second partitioned part of said ROM upon activation of said first control.

33. The accessory of claim 14 wherein a first said control is coupled to said audio generating apparatus, and said audio generating apparatus is configured, so as to generate at least one speech pattern and at least one sound effects pattern upon activation of said first control.

34. The accessory of claim 19 wherein said ROM is partitioned and configured so as to store said at least one speech pattern and said at least one sound effects pattern to be independently readable, and wherein said audio generating apparatus is configured so that at least one speech pattern and at least one sound effects pattern may be sounded in at least one desired sequence by activation of at least one control.

35. The accessory of claim 34 wherein a first said control is coupled to said audio generating apparatus, and said audio generating apparatus is configured, so as to generate at least one speech pattern from a first partitioned part of said ROM and at least one sound effects pattern from a second partitioned part of said ROM upon activation of said first control.

36. The toy of claim 22 wherein a first said control is coupled to said audio generating apparatus, and said audio generating apparatus is configured, so as to generate at least one speech pattern and at least one sound effects pattern upon activation of said first control.

37. The toy of claim 25 wherein said ROM is partitioned and configured so as to store said at least one speech pattern and said at least one sound effects pattern to be independently readable, and wherein said audio generating apparatus is configured so that at least one speech pattern and at least one sound effects pattern may be sounded in at least one desired sequence by activation of at least one control.

38. The toy of claim 37 wherein a first said control is coupled to said audio generating apparatus, and said audio generating apparatus is configured, so as to generate at least one speech pattern from a first partitioned part of said ROM and at least one sound effects pattern from a second partitioned part of said ROM upon activation of said first control.

* * * * *